US011758460B1

(12) United States Patent
Myron et al.

(10) Patent No.: US 11,758,460 B1
(45) Date of Patent: Sep. 12, 2023

(54) MANAGING LOCAL APPLICATION CONNECTIVITY IN A MULTI-NETWORK ENVIRONMENT

(71) Applicant: T-Mobile USA, Inc., Bellevue, WA (US)

(72) Inventors: Peter P. Myron, Renton, WA (US); Michael J. Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 52 days.

(21) Appl. No.: 17/165,816

(22) Filed: Feb. 2, 2021

(51) Int. Cl.
*H04W 40/12* (2009.01)
*H04W 28/08* (2023.01)

(52) U.S. Cl.
CPC .......... *H04W 40/12* (2013.01); *H04W 28/08* (2013.01)

(58) Field of Classification Search
CPC .............................. H04W 40/12; H04W 28/08
See application file for complete search history.

(56) References Cited

U.S. PATENT DOCUMENTS

| 6,400,686 | B1 | 6/2002 | Ghanwani et al. | |
|---|---|---|---|---|
| 7,693,537 | B2 | 4/2010 | Usuda et al. | |
| 8,203,942 | B2 * | 6/2012 | Hernandez | H04L 47/781 370/235 |
| 8,908,631 | B2 * | 12/2014 | Jing | H04L 69/22 370/235 |
| 9,001,748 | B2 * | 4/2015 | Park | H04L 12/2834 455/450 |
| 9,444,755 | B2 | 9/2016 | Anzai et al. | |
| 9,819,904 | B2 * | 11/2017 | Hui | H04L 47/2416 |
| 11,051,320 | B1 * | 6/2021 | Siraj | H04W 72/1247 |
| 11,140,597 | B2 * | 10/2021 | Liu | H04W 76/18 |
| 11,190,980 | B1 * | 11/2021 | Kwok | H04W 80/02 |
| 2008/0056192 | A1 * | 3/2008 | Strong | H04W 28/02 370/331 |
| 2013/0329550 | A1 * | 12/2013 | Kotecha | H04L 47/2475 370/230 |

(Continued)

FOREIGN PATENT DOCUMENTS

WO    WO-2021169998 A1 * 9/2021
WO    WO-2021208561 A   * 10/2021

*Primary Examiner* — Parth Patel
(74) *Attorney, Agent, or Firm* — Lee & Hayes, P.C.

(57) ABSTRACT

Systems may comprise a connectivity manager application operating on a User Equipment (UE) for optimal and secure performance of local applications and improving user experience by optimizing application performance (e.g., by prioritizing file downloads). The systems may modify data transmission of other local applications on the UE in a multi-network environment. The connectivity manager application may detect one or more network characteristics of one or more networks providing service to the UE and determine a connectivity rule based at least in part on the one or more network characteristics and/or particular data types and indicating that data transmission for the one or more transmission paths is to be adjusted, modified, paused, or prohibited in response to particular network conditions, etc. The connectivity manager application may cause modifications to the transmission paths and present indications of the modifications at a graphical user interface (GUI) or via application programming interfaces and call-backs.

20 Claims, 6 Drawing Sheets

(56) References Cited

U.S. PATENT DOCUMENTS

| | | | |
|---|---|---|---|
| 2015/0078351 A1* | 3/2015 | An | H04W 28/22 370/336 |
| 2016/0014841 A1* | 1/2016 | Karlsson | H04W 76/27 370/311 |
| 2019/0158413 A1* | 5/2019 | Patil | H04W 76/15 |
| 2019/0306068 A1* | 10/2019 | Kiss | H04L 47/193 |
| 2019/0306752 A1* | 10/2019 | Lai | H04W 88/06 |
| 2019/0306871 A1* | 10/2019 | Liu | H04L 1/18 |
| 2019/0357082 A1* | 11/2019 | Kim | H04W 80/10 |
| 2019/0357294 A1* | 11/2019 | Ha | H04W 76/15 |
| 2020/0015302 A1* | 1/2020 | Shikari | H04L 43/0864 |
| 2020/0146002 A1* | 5/2020 | An | H04W 74/004 |
| 2020/0195539 A1* | 6/2020 | Sivaraj | H04W 28/0992 |
| 2020/0196182 A1* | 6/2020 | Nam | H04W 84/12 |
| 2020/0275313 A1* | 8/2020 | He | H04W 28/0284 |
| 2020/0280901 A1* | 9/2020 | Na | H04W 76/15 |
| 2020/0322244 A1* | 10/2020 | Takitsune | H04W 28/04 |
| 2020/0336937 A1* | 10/2020 | Youn | H04W 76/18 |
| 2020/0351756 A1* | 11/2020 | Jager | H04L 47/24 |
| 2021/0029584 A1* | 1/2021 | Chauhan | H04W 48/20 |
| 2021/0092645 A1* | 3/2021 | Grayson | H04W 28/18 |
| 2021/0127298 A1* | 4/2021 | Harmsen | H04W 40/28 |
| 2021/0168651 A1* | 6/2021 | Marquezan | H04W 28/0804 |
| 2021/0211927 A1* | 7/2021 | Park | H04W 72/1242 |
| 2021/0258868 A1* | 8/2021 | Wong | H04L 67/00 |
| 2021/0298042 A1* | 9/2021 | Siraj | H04W 28/12 |
| 2021/0320883 A1* | 10/2021 | Venkataraman | H04L 69/08 |
| 2021/0360468 A1* | 11/2021 | Nieto Aliques | H04W 28/0819 |
| 2021/0360476 A1* | 11/2021 | Huang | H04L 69/24 |
| 2021/0360650 A1* | 11/2021 | Huang | H04W 72/085 |
| 2021/0409335 A1* | 12/2021 | Zhu | H04L 47/24 |
| 2021/0410010 A1* | 12/2021 | Salkintzis | H04W 28/0804 |
| 2022/0014478 A1* | 1/2022 | Lee | H04L 47/762 |
| 2022/0014494 A1* | 1/2022 | Amend | H04L 61/10 |
| 2022/0014963 A1* | 1/2022 | Yeh | G06N 7/005 |
| 2022/0030461 A1* | 1/2022 | Kanamarlapudi | H04L 47/39 |
| 2022/0095398 A1* | 3/2022 | Pan | H04W 88/04 |
| 2022/0116327 A1* | 4/2022 | Salkintzis | H04W 28/0838 |

* cited by examiner

MANAGING LOCAL APPLICATION CONNECTIVITY IN A MULTI-NETWORK ENVIRONMENT

BACKGROUND

A mobile computing device is typically capable of accessing multiple different types of cellular networks to transmit data via applications operating on the mobile computing device. The different cellular networks may have different network characteristics, such as different available bandwidths. However, many applications operating on the mobile computing device are not configured to distinguish between different networks having different network characteristics. Rather, applications are typically designed to optimally perform on only one particular network type. Accordingly, when the mobile computing device connects to different networks, the performance and user experience of the mobile computing device may suffer.

Additionally, even when the mobile computing device is connected to a particular type of network for which an application is optimized, the network characteristics of the network can still change suddenly, rapidly, and/or in unanticipated ways (e.g., a sudden drop in bandwidth), causing the performance of the application to suffer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
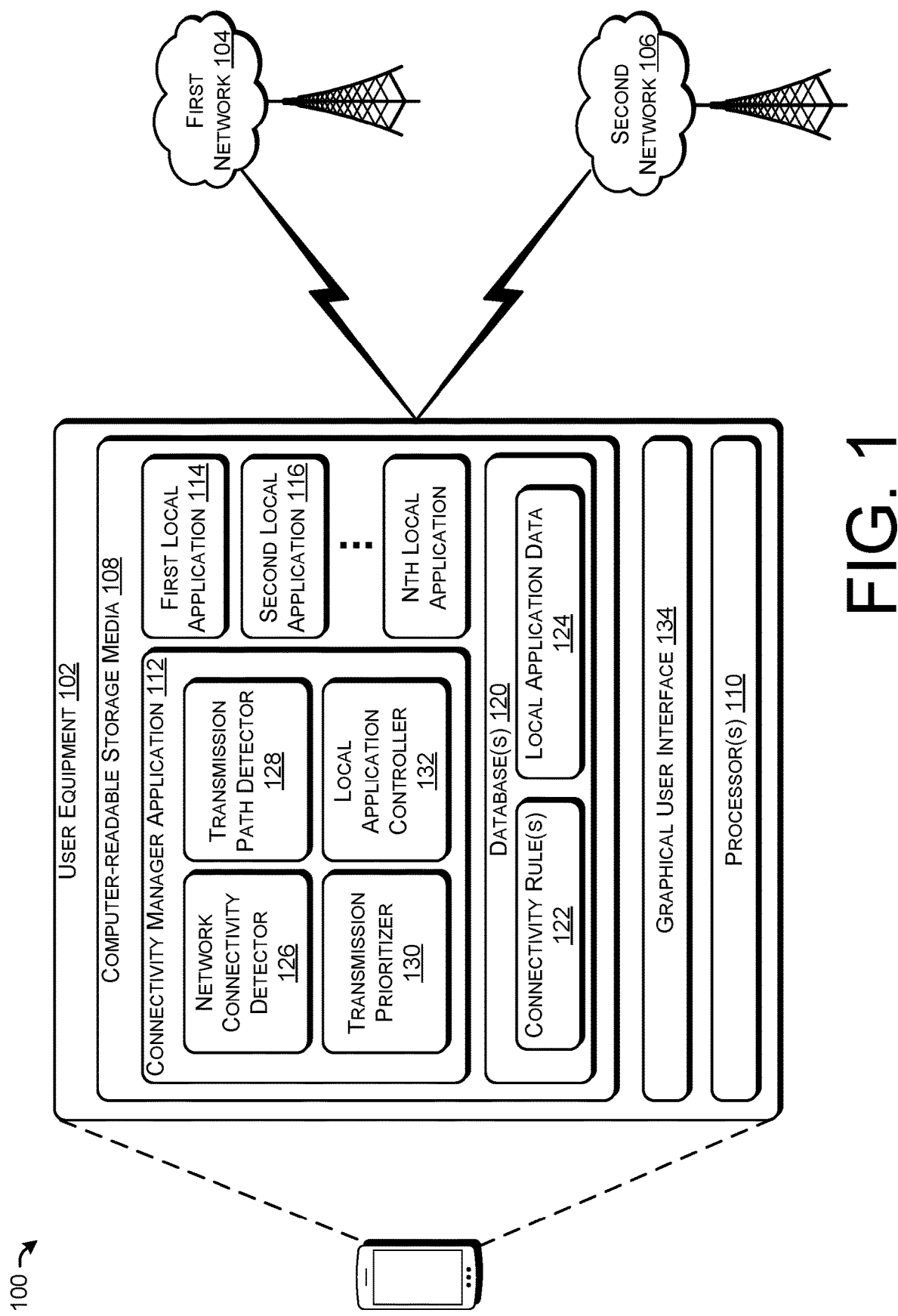
FIG. 1 depicts a schematic diagram of an example system for managing connectivity of local applications on a user equipment (UE) in a multi-network environment.

Systems, methods, and apparatuses (hereinafter the "system") disclosed herein may include a connectivity manager application operating on a User Equipment (UE) for managing data transmission of other applications stored and/or executing on the UE (e.g., "local applications") in a multi-network environment. For instance, the UE may connect to a variety of different networks having different network characteristics (e.g. fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX® technology, Wi-Fi®, etc.) Moreover, the network characteristics of the network to which the UE connects may not be persistent and/or may change suddenly. However, a local application on the UE may be configured to only transmit data according to persistent network characteristics of a particular type of network. When the UE connects to a second network comprising second network characteristics that are different than the first network characteristics for which the local application is configured, or when the first network characteristics are not persistent and/or change suddenly, the local application may experience poor user experience because data transmission performance for different data types does not match the user's needs or expectations.

In some examples, the connectivity manager application may perform one or more steps for improving the data transmission performance of the local application in the multi-network environment. For instance, the connectivity manager application may comprise a network connectivity detector to determine one or more network characteristics (e.g., bandwidth, latency, reliability, cost, fee type, security, and/or persistency) of one or more networks forming the multi-network environment. In some instances, the network connectivity detector may continually query and/or periodically determine the one or more network characteristics to detect whether and to what extent the first network characteristics are not persistent and/or changing.

In some examples, the connectivity manager application may comprise a transmission path detector for determining one or more transmission paths of one or more local applications. For instance, the transmission path detector may send and/or receive one or more API calls from the connectivity manager application to the local application to determine local application data indicating, for instance, a particular pathname corresponding to a particular data transmission path the local application uses to send and receive data. The transmission path detector may determine a particular type of data corresponding to the transmission path. In some examples, the transmission path detector may determine multiple transmission paths of multiple, different local applications for transmitting multiple, different types of data, for instance, based on Multipurpose Internet Mail Extension (MIME) message data. In some instances, a first transmission path may correspond to a text data type, a second transmission path may correspond to an audio data type, and/or a third transmission path may correspond to a video data type.

In some examples, the connectivity manager application may comprise a transmission prioritizer for determining one or more transmission priorities for the local application, multiple other applications operating on the UE, and/or transmission paths of the local application or multiple other applications. In some instances, the one or more transmission priorities may indicate how traffic among multiple applications is prioritized such that background applications may receive a lower transmission priority. For instance, the transmission prioritizer may receive data indicating the one or more network characteristics (e.g., from the network connectivity detector) and data indicating the one or more transmission paths. The transmission prioritizer may access one or more databases, for instance, to receive one or more priority threshold values. The transmission prioritizer may determine, based at least partly on the one or more network characteristics and the transmission paths, a particular priority threshold value that corresponds to the network characteristics and/or the transmission paths. Upon determining the particular priority threshold value corresponds to the one or more network characteristics and/or one or more transmission priorities, the transmission prioritizer may compare the one or more network characteristics and/or one or more transmission priorities to the priority threshold value to determine whether to change a transmission parameter of the one or more transmission paths.

In some examples, the connectivity manager application may comprise a local application controller for communicating with and causing changes to one or more local applications on the UE. The local application controller may generate and/or send one or more API calls to a first local application, a second local application, a third local application, and/or any number N local applications. For instance, the local application controller may send an API call to the first local application instructing the first local application to change a transmission parameter (e.g., to inhibit, pause, and/or adjust data downloads) for a particular transmission path. The local application controller may generate and/or send multiple API calls to the first local application, the second local application, the third local application, etc., to change multiple transmission parameters of multiple transmission paths.

In some examples, the connectivity manager application may adjust how the local applications transmit different types of data to correspond to a connectivity change from the first network to the second network, or a sudden network characteristic change of the first network. Accordingly, operations performed by the connectivity manager application may improve or optimize data transmission performance of the local applications. In a particular example, the local application may comprise a social media application, the first transmission path may transmit a text data type, the second transmission path may transmit a photo data type, and the third transmission path may transmit a video data type. The network connectivity detector may determine that the UE has disconnected from a 5G network (e.g., the first network) and connected to a 4G network (e.g., the second network). First network characteristics of the 5G network may include high bandwidth, and/or low latency whereas second network characteristics of the 4G network low bandwidth and/or high latency. The transmission path detector may communicate with the social media application and/or detect or analyze one or more MIME messages from the social media application to determine that a first pathname of a first transmission path comprises "videos.example.com" and, based on the first pathname, determine that the first transmission path corresponds to a video data type. The transmission path detector may determine that a second pathname of a second transmission path comprises "thumbnails.example.com" and, based on the first pathname, determine that the second transmission path corresponds to an image data type. The connectivity manager application may determine that, based on the change from the 5G network to the 4G network, that the image data type has a higher transmission priority than the video data type. In response, the connectivity manager application may send one or more API calls to the social media application causing the social media application to pause, stop, or reduce data transmission via the videos.example.com transmission path and/or continue, maintain, or even increase data transmission via the thumbnails.example.com transmission path.

In some examples, operations performed by the connectivity manager application and/or other components of the system discussed herein may improve the functionality of a mobile computing device (e.g., the UE). By adjusting transmission parameters of the transmission paths, protocols, or priorities in response to changing network characteristics, the system may cause local applications operating on the UE to operate more efficiently and effectively while consuming less computing resources (e.g., CPUs of processing, bytes of memory, power from a battery) for instance, by prohibiting downloading for certain types of lower priority data (e.g., videos or images) while allowing downloading for other types of higher priority data (e.g., text). Moreover, by continually adjusting the transmission parameters as the UE moves through different types of network coverages, and while the traffic on the networks changes, a more efficient mode of operation for the UE is maintained.

FIG. 1 depicts an example system 100 for managing connectivity for a UE 102 in a multi-network environment. The multi-network environment may comprise a first network 104, a second network 106, or any number of networks (which may be different types of networks comprising different network characteristics) providing cellular service to the UE 102. The UE 102 may comprise non-transitory computer-readable storage media 108 and one or more processors 110 and for storing and executing a connectivity manager application 112 and one or more other local applications, such as a first local application 114, a second local application 116, and/or any number of local applications. The non-transitory computer-readable storage media 108 may comprise one or more databases 120 storing data generated and/or retrieved by the connectivity manager 112 for managing connectivity of the local applications. For instance, the one or more databases 120 may store one or more connectivity rules 122 and/or local application data 124.

Figure 3:
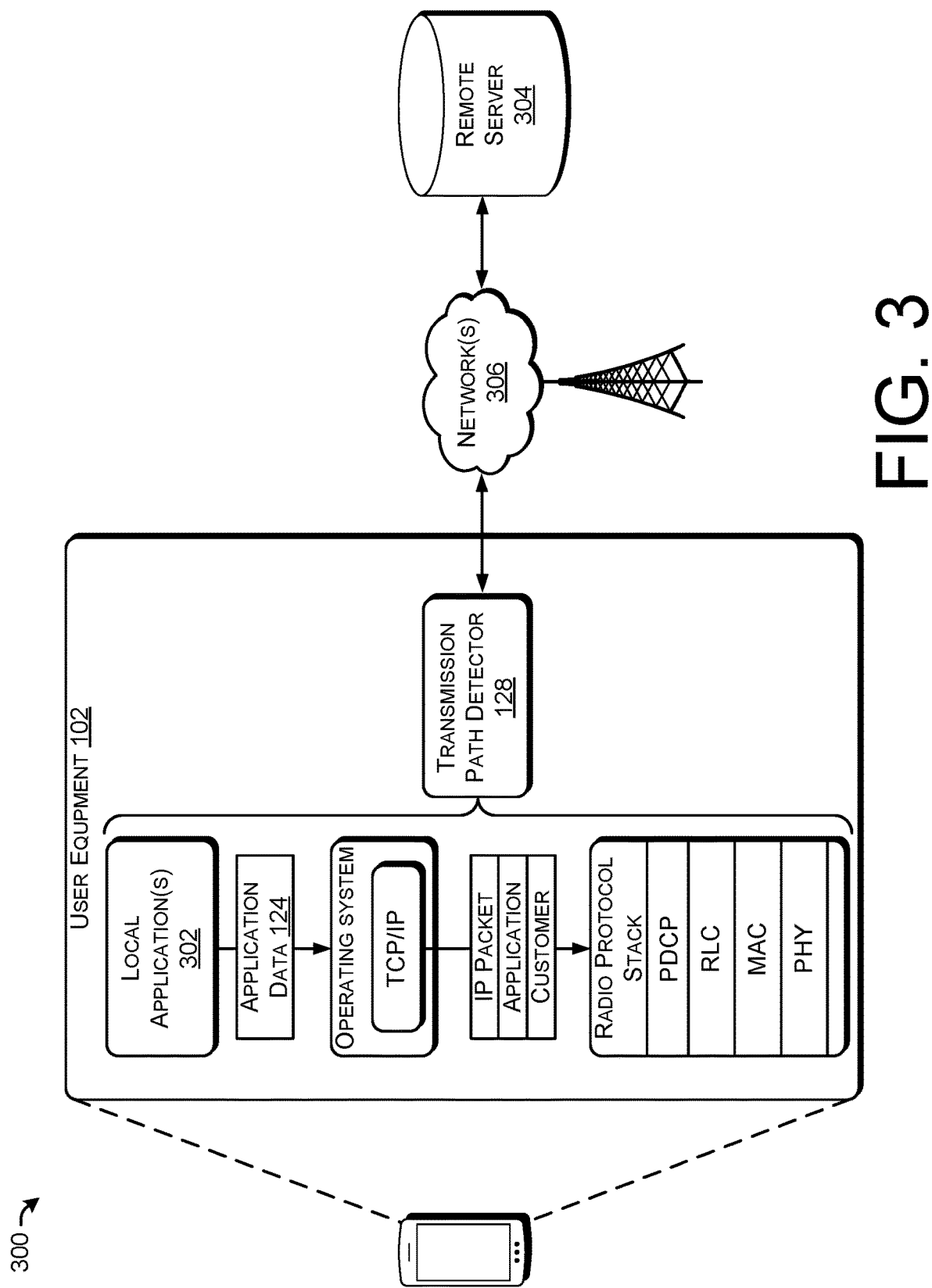
FIG. 3 depicts a schematic diagram of a transmission path detector for determining one or more transmission paths, which may form at least a portion of any system discussed herein.

In some examples, the UE 102 may comprise a computing device associated with a client, end-user, calling party, and/or a terminating device, such as a Session Initiated Protocol (SIP)-enabled handset. The UE 102 may comprise a wireless communication interface for establishing cellular connections with service provider networks, for instance, multiple different types of networks. The UE 102 may comprise a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as non-mobile computing devices including, without limitation, a television (smart television), set-top-box (STB), desktop computer, and the like. The UE 102 is discussed in further detail below (FIG. 3).

In some examples, the first network 104 may comprise a 3rd Generation Partnership Program (3GPP) wireless network, such as a 3G network, a 4G network, a 4G Long Term Evolution (LTE) network, a LTE Advanced network, a 5G network, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX® technology, Wi-Fi®, an evolved IP Multimedia System (IMS) network, combinations thereof, and the like. The first network 104 may comprise one or more nodes, such as wireless nodes or wired nodes, that are coupled to a core network and/or some other network. The first network 104 may also include one or more access points, one or more gateways, and one or more service nodes. One or more nodes of the first network 104 may handle traffic and signals between electronic devices, such as the UE 102. For example, a node of the first network 104 may perform transcoding of speech channels, allocation of radio channels to electronic devices, paging, transmission and reception of voice and data, as well as other functions. The first network 104 may comprise one or more base transceiver stations (BTS), each BTS may include a transceiver, antenna, and additional network switch and control equipment that provide a network cell for facilitating wireless communication between the UE 102 and the first network 104. In some examples, the nodes of the first network 104 may include an access node such as a gNodeB and/or an eNodeB.

The first network 104 may comprise one or more first network characteristics, such as high bandwidth or low bandwidth, low latency or high latency, high reliability or low reliability, low cost or high cost, flat fee type, or timed fee type, secured or unsecured. Moreover, the one or more first network characteristics may be persistent (e.g., unchanging within a predetermined range) or the one or more first network characteristics may change suddenly or rapidly (e.g., in response to an increase or decrease in traffic on the network and/or changing proximity to an access node).

In some examples, the second network 106 may comprise a different type of network than the first network 104. The second network 106 may comprise a 3rd Generation Partnership Program (3GPP) wireless network, such as a 3G network, a 4G network, a 4G Long Term Evolution (LTE) network, a LTE Advanced network, a 5G network, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX® technology, Wi-Fi®, an evolved IP Multimedia System (IMS) network, combinations thereof, and the like. The first network 104 and the second network 106 may comprise any combination of the different network types. As such, the second network 106 may comprise one or more second network characteristics such as high bandwidth or low bandwidth, low latency or high latency, high reliability or low reliability, low cost or high cost, flat fee type or timed fee type, and/or secured or unsecured, that are different than the one or more first network characteristics. In some instances, the first network 104 and the second network 106 may comprise a same type of network, yet may still comprise different network characteristics (e.g., due to a first amount of traffic on the first network 104 being greater, lesser, or different, than a second amount of traffic on the second network 106).

In some examples, the UE 102 may comprise the non-transitory computer-readable storage media 108 for storing data and algorithms to be executed. The non-transitory computer-readable storage media may comprise one or more memory components such as a phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, combinations thereof, or any other medium that can be used to store information for retrieval by an electronic computing device. Databases discussed herein, for instance stored at non-transitory computer-readable storage media 108, may include one or more of a comma delimited list, a spreadsheet, an array, a NoSQL data structure, a hash-based data structure, an object-based data structure, or any other data type, data structure, and/or data system for storing retrievable data.

In some examples, the UE 102 may comprise the one or more processor(s) 110, such as a microprocessor, a microcomputer, a microcontroller, a digital signal processor, a central processing unit (CPU), a graphics processing unit (GPU), a quantum processor, combinations thereof, etc. Among other capabilities, the one or more processor(s) 110 may operate to fetch and execute computer-readable instructions stored in the non-transitory computer-readable storage media 108, for instance, to perform the operations disclosed herein.

In some examples, the UE 102 may store and/or execute the connectivity manager application 112. The connectivity manager application 112 may comprise algorithmic components (e.g., software) for performing operations on the UE 102, such as a network connectivity detector 126, a transmission path detector 128, a transmission prioritizer 130, and/or a local application controller 132. Although the algorithmic components of the connectivity manager application 112 may be described as distinct components, in some instances, one or more of the network connectivity detector 126, a transmission path detector 128, a transmission prioritizer 130, and/or the local application controller 132 may be functionally combined and/or interact with each other to perform operations described herein. Although various elements of FIG. 1 are shown and described as being discrete devices or components for purposes of discussion, any of the illustrated executable components may, in practice, include one or more physical, virtual, or otherwise abstracted cluster or network of machines and/or devices. Moreover, although a single UE 102 is depicted, the system 100 may include any number and types of UEs 102.

Figure 2:
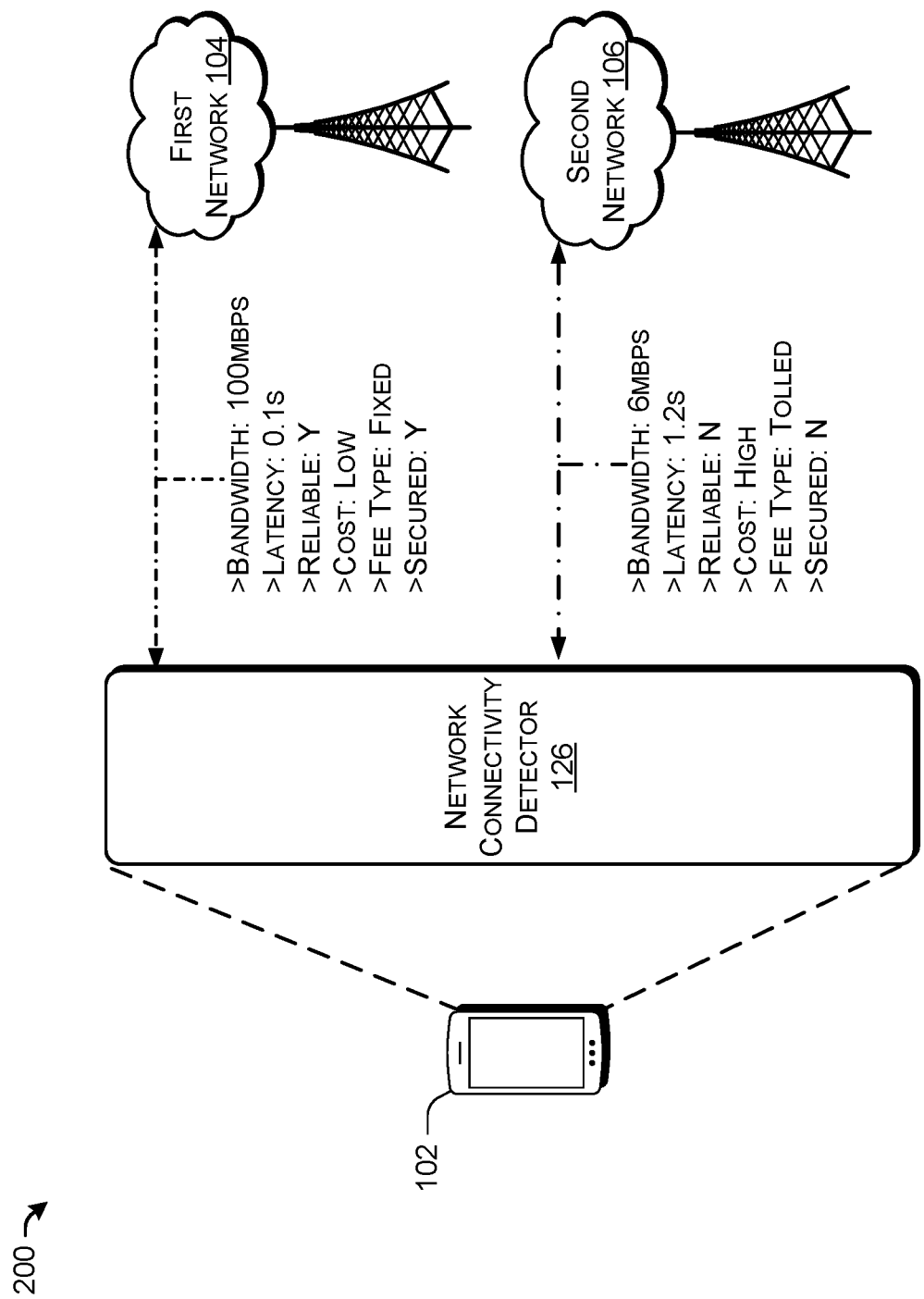
FIG. 2 depicts a schematic diagram of an example network connectivity detector for detecting one or more network characteristics, which may form at least a portion of any system discussed herein.

In some examples, the connectivity manager application 112 may comprise the network connectivity detector 126 for determining the first one or more network characteristics of the first network 104 and/or the second one or more network characteristics of the second network 106. The connectivity manager application 112 may use connectivity-related data collected or determined by the network connectivity detector 126 to determine which connectivity rules 122 are relevant for the current multi-network environment and/or which transmission paths may be modified. The network connectivity manager 126 is discussed in greater detail below (FIG. 2).

In some examples, the connectivity manager application 112 may comprise the transmission path detector 128 for identifying transmission paths of the local applications operating on the UE 102. For instance, the transmission path detector 128 may send one or more API calls to the local applications querying the local applications for local application data, and/or the transmission path detector 128 may access other data stored at the UE 102 and/or at a remote server for determining transmission paths of the local applications and particular types of data corresponding to particular transmission paths. For instance, the transmission path detector may receive and/or analyze one or more MIME messages or MIME type data from the local applications. The transmission path detector 128 is discussed in greater detail below (FIG. 3).

Figure 4:
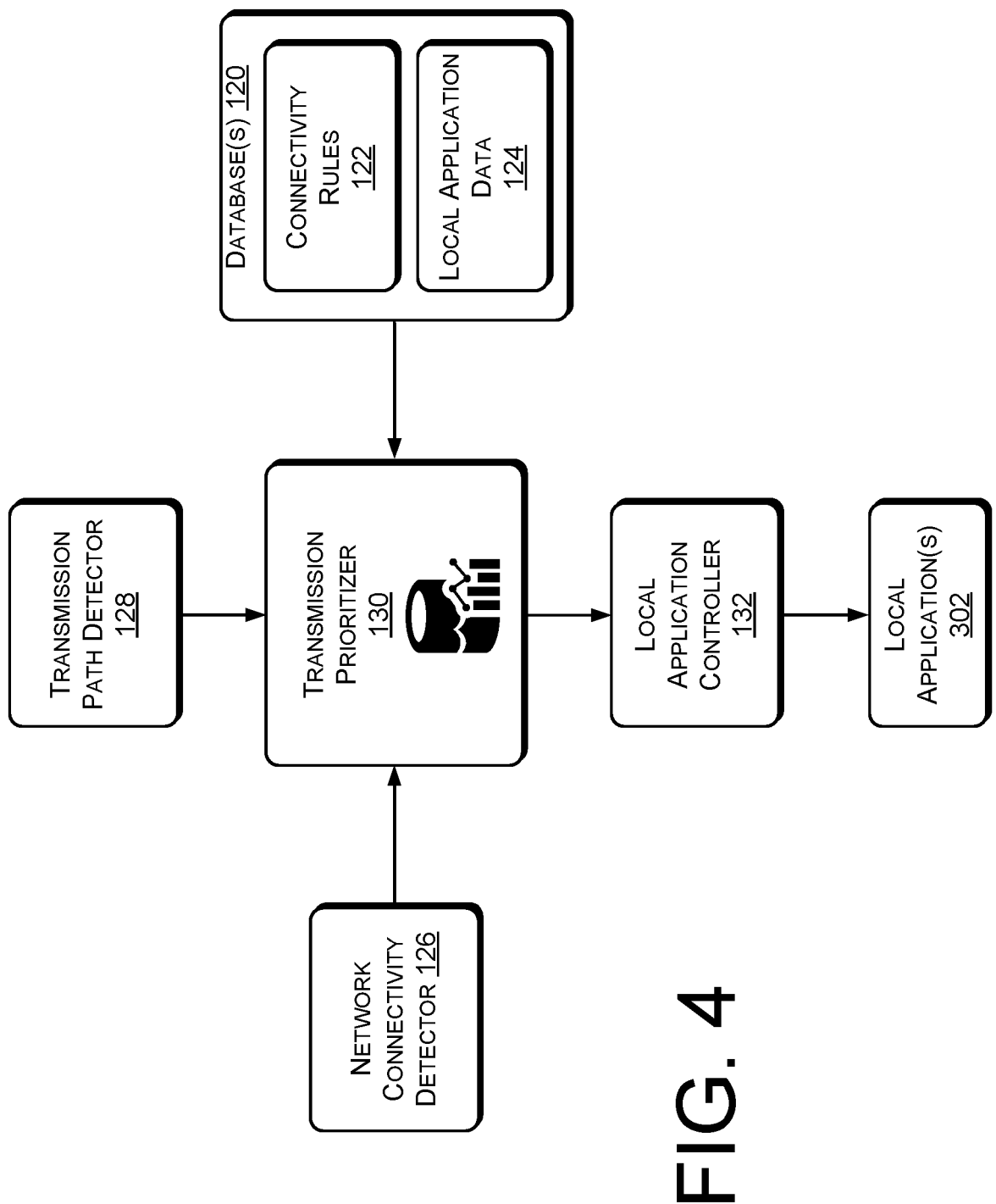
FIG. 4 depicts a schematic diagram of an example transmission prioritizer for determining connectivity rules corresponding to the one or more network conditions and transmission paths, which may form at least a portion of any system discussed herein.

In some examples, the connectivity manager application 112 may comprise the transmission prioritizer 130 for assessing information received from and/or generated by the network connectivity detector 126 and the transmission path detector 128 and determining which, if any, transmission paths of the local applications to modify. The transmission prioritizer 130 may access connectivity rules 122 stored in the one or more databases 120 and/or stored at a remote storage device and, based on the connectivity rules 122, determine that changing a particular transmission parameter of a particular transmission path (reducing, pausing, and/or prohibiting downloads and/or uploads) will increase data transmission efficiency and/or maintain effective local application operation (e.g., with minimal negative impact on user experience) for the changing network characteristics of the multi-network environment (or network characteristics different than those for which the local application is configured). The transmission prioritizer 130 is discussed in greater detail below (FIG. 4).

Figure 5:
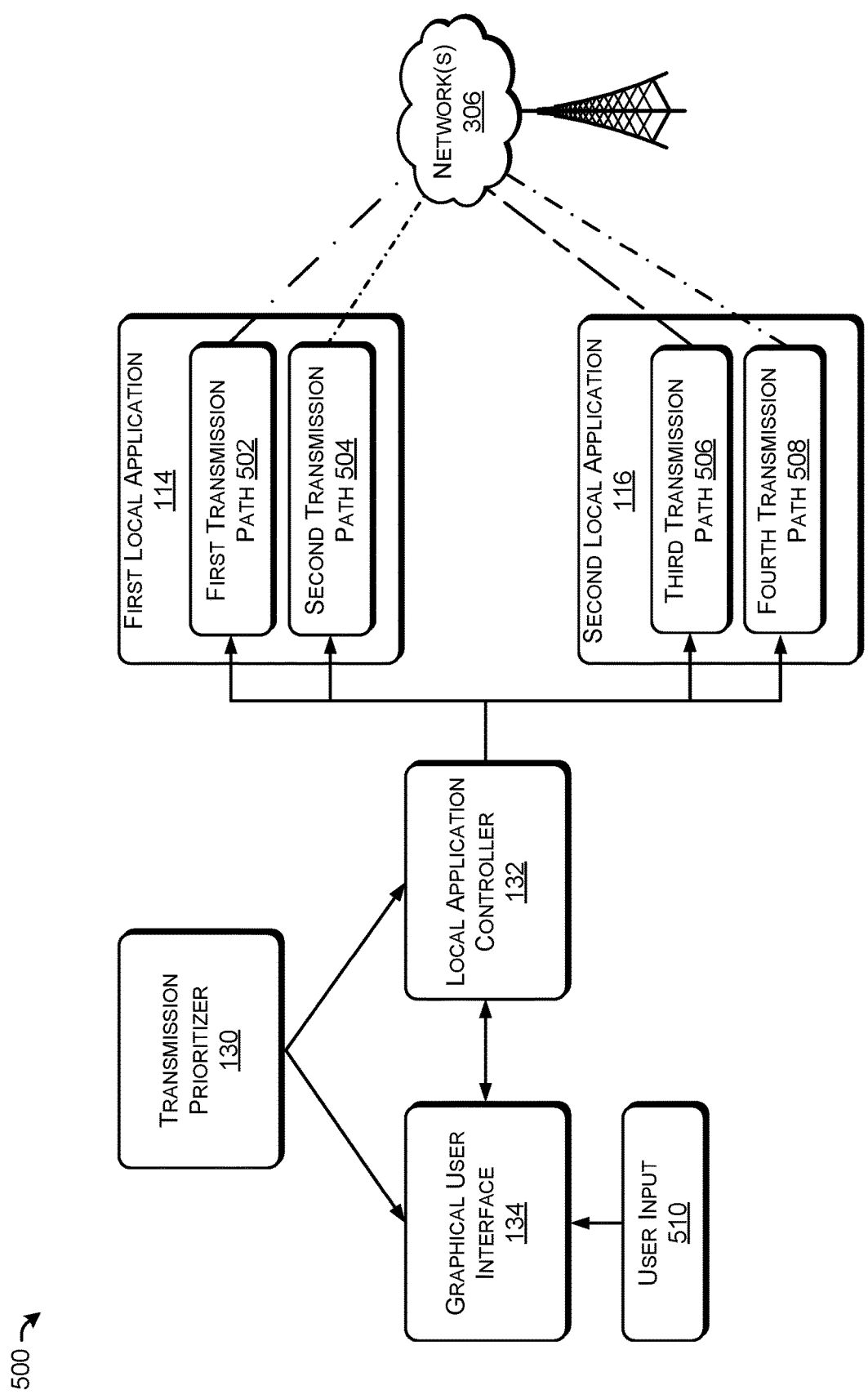
FIG. 5 depicts a schematic diagram of an example local application controller for modifying the one or more transmission paths according to the connectivity rules, which may form at least a portion of any system discussed herein.

In some examples, the connectivity manager application 112 may comprise the local application controller 132 for sending instructions to the local applications (or other components of the UE 102) to cause the change to the particular transmission parameter of the one or more transmission paths. For instance, the local application controller 132 may generate and/or send one or more API calls to the first local application 114, the second local application 116, and/or any number of local applications to cause one or more transmission paths to stop, reduce, or pause transmitting, or otherwise change a transmission parameter. The local application controller 132 may carry out modifications of the local application determined to be made by the transmission prioritizer 130. The local application controller 132 is discussed in greater detail below (FIG. 5).

In some examples, the UE 102 may comprise a graphical user interface (GUI 134). The GUI 134 may comprise a front-end of the connectivity manager application 112 or another application receiving information from the connectivity manager application 112 or a remote server (e.g., remote server 304 in FIG. 3, which may, in some examples, aggregate data from multiple connectivity manager applications 112 of multiple UEs 102).

FIG. 2 depicts an example system 200 that may be similar to, identical to, or form a portion of any of the systems discussed herein. FIG. 2 illustrates details of the network connectivity detector 126 which may determine first network characteristics of the first network 104 and/or second network characteristics of the second network 106.

In some examples, the system 200, the network connectivity detector 126 may continually or periodically query various network resources and/or components of the UE 102 to determine network characteristics of the network providing service to the UE 102. In some instances, the network connectivity detector 126 may receive information from the local applications indicating network characteristics. In some examples, the network connectivity detector 126 may determine a network type identifier (e.g., "5G" or "Wi-Fi"), IP address, and/or MAC address associated with the first network 104 and/or the second network 106 (e.g., via a SIP ACK message, ping, etc.) and may determine one or more predefined characteristics corresponding to the network type identifier IP address, and/or MAC address, such as a bandwidth, a throughput, and/or a latency. For instance, the one or more database(s) 120 may store network persistent or generally constant network characteristic information associated with the network type identifier, IP address, and/or MAC address. The network connectivity detector 126 may determine changing, dynamic, or inconsistent network characteristics, for instance, by sending a ping on the first network 104 and/or the second network 106 to determine a corresponding ping delay. The network connectivity detector 126 may determine one or more changing network characteristics of the first network 104 or the second network 106, such as a congestion increase or decrease, a traffic increase or decrease, a throughput increase or decrease, a bandwidth increase or decrease, and/or a security update. In some instances, the network connectivity detector 126 may comprise a tracking agent executing on the UE 102 and/or on another computing device (e.g., a node of the first network 104 and/or the second network 106) in communication with the UE 102.

In some embodiments, the transmission prioritizer 130 may send one or more instructions to one more network services, for instance, of a service provider, third-party service, or application developers (e.g., such as by using the first network and/or second network detected by the network connectivity detector 126) to cause, based at least partly on the transmission priorities, a change to one or more transmission characteristics of the transmission paths. In some examples, the change may occur because of operations executed at the local application(s) and/or because of operations executed at the network services (e.g., remotely from the UE 102). In some examples, the transmission prioritizer 130 may determine or receive a predefined priority, for instance, from the network service and/or from a user input (e.g., user input 510 in FIG. 5) defining the predefined priority. For instance, the predefined priority may indicate application-level priorities for optimizing user experience criteria (e.g., load text first for emails, messaging lag time, etc.) corresponding to a more beneficial user experience.

In some examples, the network connectivity detector 126 may determine whether the first network 104 and/or the second network 106 comprises a wired network or a wireless network based, for instance, on accessing or retrieving data on the UE 102, such as an indication of IP addresses to which the UE 102 has connected (to compare to a predefined list indicating wireless networks), or by determining, through the operating system, the hardware MAC address and/or whether the UE 102 connects to a wireless modem or an ethernet connection. In some examples, the network connectivity detector 126 may determine whether the first network 104 and/or the second network comprises a high bandwidth network or a low bandwidth network, by detecting throughput (e.g., via an abstracted service downloading one or more test files) or by calculating a throughput (e.g., via observing the headers of traffic and duration of download). The network connectivity detector 126 may access data stored in the one or more databases 120 indicating a predetermined or previously known signal ratio for Wi-Fi® and/or types of RAN networks, such that the network connectivity detector 126 may anticipate the bandwidth for a particular type of network. The network connectivity detector 126 may determine the bandwidth based on receiving signal strength indicator (RSSI) value corresponding to the network.

In some examples, the bandwidth (and any other network characteristics) may be determined to be a "high" classification or a "low" classification based on the bandwidth being above or below one or more predetermined bandwidth threshold values (e.g., stored at the one or more databases 120) defining one or more thresholds for which bandwidths fall into a "high" bandwidth category or a "low" bandwidth category. The predetermined bandwidth threshold value defining the "high" bandwidth category may comprise, for example, at least 30 megabits/second, 50 megabits/second, or 100 megabits/second. The predetermined bandwidth threshold value defining the "low" bandwidth category may comprise less than 30 megabits/second, 20 megabits/second, 10 megabits/second, or 5 megabits/second. In some instances, the one or more databases 120 may store a cut-off threshold value defining bandwidths above the cut-off threshold value to comprise the "high" bandwidth category and defining bandwidths below the cut-off threshold value to comprise the "low" bandwidth category. Additionally, or alternatively, the network connectivity detector 126 may determine the "high" bandwidth category and/or the "low" bandwidth category based at least partly on a weighted average of total detected bandwidths at the UE 102 over a period of time, and defining an upper percentile (e.g., a top 25%) to comprise the "high" bandwidth category and/or defining a lower percentile (e.g., a bottom 25%) to comprise the "low" bandwidth category. In some instances, the network connectivity detector 126 may receive data from a remote server (e.g., remote server 304 in FIG. 3) to update the bandwidth threshold value and/or update how the UE 102 defines the "high" bandwidth category and/or the "low" bandwidth category. Although the network characteristic of bandwidths is discussed by way of example above for brevity-sake, similar or identical techniques may define any of the network characteristics discussed herein into a "high" category and/or a "low" category, for instance, based on a predetermined threshold value, defining an upper or lower percentile, and/or combinations thereof.

In some examples, the network connectivity detector 126 may determine whether the first network 104 and/or the second network 106 comprises a low latency network or high latency network, for instance, by performing a ping test on the first network 104 and/or the second network 106. In some instances, an abstracted ping or latency-determining service may be stored on a hardware component of the UE 102.

In some examples, the network connectivity detector 126 may determine whether the first network 104 and/or the second network 106 comprises a reliable network or an unreliable network. For instance, the network connectivity detector 126 may query, on the first network 104 and/or the second network 106 and/or via a transmission control protocol (TCP) and/or a user datagram protocol (UDP) query, for network stack statistics indicating a number of lost packets and/or an indication of misordered of packets.

In some examples, the network connectivity detector 126 may determine whether the first network 104 and/or the second network 106 comprises a low-cost network or a high-cost network. For instance, the connectivity manager application 112 may access information corresponding to a subscriber identification module (SIM) at the UE 102, which may indicate whether the UE 102 comprises a global SIM corresponding to a high-cost network or a local SIM corresponding to a low-cost network. In some instances, the network connectivity detector 126 may access particular account information associated with the UE 102 and/or SIM indicating whether connecting to first network 104 and/or the second network 106 will increase a bill or fee, for instance, based on a pay-per-bandwidth payment plan or a plan that limits an amount of bits per month available to the UE 102. In some instances, a node of the first network 104 and/or the second network 106 could store billing information accessible by the UE 102 to determine costs of connecting to the first network 104 and/or the second network 106. In some examples, the network connectivity detector 126 may determine whether the first network 104 and/or the second network 106 comprises a flat fee type network or tolled-by-time or tolled-by-data unit network, for instance, using similar or identical techniques as used for determining network costs.

In some instances, the network connectivity detector 126 may determine whether the first network 104 and/or the second network 106 comprises a secured network or an unsecured network. For instance, the network connectivity detector 126 may determine whether a message sent on the first network 104 and/or the second network 106 comprises an encrypted message or an unencrypted message, whether the first network 104 and/or the second network 106 requires security credentials for access, and/or whether the first network 104 and/or the second network 106 is on an allowed list or a blocked list (which may be user defined).

FIG. 3 depicts an example system 300 that may be similar to, identical to, or form a portion of any of the systems discussed herein. FIG. 3 illustrates details of the transmission path detector 128, for instance, determining one or more transmission paths of one or more local applications 302 (e.g., first local application 114 and/or second local application 116).

In some examples, the transmission path detector 128 may determine the one or more transmission paths based at least in part on information received from the local applications on the UE 102 (e.g., the first local application 114 and/or the second local application 116), the one or more databases 120, one or more nodes of the first network 104 or second network 106, and/or from a remote server 304 (e.g., by connecting to one or more networks 306, such as the first network 104 and/or the second network 106), such as one or more MIME type data. In some examples, the transmission paths may comprise a one-to-one correspondence with one or more types of data, such that individual transmission paths are dedicated to a particular type of data (e.g., video, images, text, etc.). In some instances, the transmission path detector 128 may monitor and/or collect information (e.g., continuously or periodically) regarding run-time activities of the local applications 302 or (at least portions of) application platforms executed on the UE 102. The transmission path detector 128 may determine the one or more transmission paths, for instance, by determining one or more strings from a header portion or a body portion of a message sent from the local applications 302 and comparing the one or more strings to a plurality of data type profile strings indicating the one or more transmission paths. The transmission path detector 128 may determine a type of data being sent during the run-time activities (e.g., based on one or more MIME types, filenames, or filename extensions) and may timestamp local application run-time activities and/or categorize local application run-time activities based on the type of data being transmitted during the run-time activities. Information collected by the transmission path detector 128 may comprise application names corresponding to the local applications 302, types of data sent by the local applications 302, a frequency with which a particular type of data is sent, user ID (UID) of the applications, type or category of the local applications 302, destination IP addresses and domain names (or SNIs) of the local applications 302, the timestamps, and quantity of data associated with the respective application. The transmission path detector 128 may, in some cases, indicate the particular application that generated a particular data packet. As examples, different application identifiers may correspond respectively to applications such as social media, graphic editing, video conferencing, etc.

Alternatively, application identifiers may correspond to application types, such as video, audio, email, shopping, chat, finance, health, industrial control, etc. An application identifier may also correspond to a server application to which the data packet is destined. The customer identifier may indicate or correspond to a customer, such as an individual or organization using the UE 102 or to whom the UE 102 belongs. As another example, the customer identifier may indicate or correspond to a particular customer account with which the UE 102 is associated, and/or the customer identifier may indicate or correspond to a provider of services with which a received data packet is associated.

In some examples, the transmission path detector 128 may determine one or more endpoint addresses and/or pathnames corresponding to one or more transmission paths of the local applications 302 (e.g., the first local application 114 and/or the second local application 116). The pathnames may comprise an alphanumeric string including an indication of a data type (e.g., "videos," "images," "thumbnail," "audio," "screenshot," "text," "comments," "ads"), and/or an application identifier (e.g., social media, email, audio streaming, etc. application names), and/or other information indicating a type of data transmitted by the transmission path. For instance, the transmission path detector 128 may determine a first pathname of a first transmission path of the first local application 114 comprises "ads.example.com;" a second pathname of a second transmission path of the first local application 114 comprises "videos.example.com;" a third pathname of a third transmission path of the first local application 114 comprises "thumbnails.example.com;" etc. In some instances, the one or more databases 120 may store predetermined local application data indicating pathnames of transmission paths for particular local applications 302 (e.g., commonly downloaded applications). In some examples, the transmission path detector 128 may access information from a third-party ad tracker to determine the one or more transmission paths, corresponding pathnames, and/or types of data being transmitted by the one or more transmission paths. The transmission path detector 128 may query the local applications 302 for a list of directory names and/or determine whether any directory names include an alphanumeric string indicating a type of data (e.g., "profile pictures," "videos," "comments," etc.). In some instances, the transmission path detector 128 may access one or more UE 102 device settings and/or application updates to determine one or more transmission paths, pathnames, and/or types of data being transmitted by the first local application 114 and/or the second local application 116. For example, the transmission path detector 128 may determine that data is being transmitted via a WebSocket and may determine that the WebSocket corresponds to a video type of data. The transmission path detector 128 may determine that the data is being transmitted via an Hypertext Transfer Protocol (HTTP) request, and/or a different type of request (e.g., a TCP message, an internet control message protocol (ICMP) message, a distributed network protocol (DNP) message, etc.) indicating a particular type of data (e.g., Hypertext Markup Language (HTML) text). In some instances, the transmission path detector 128 may continually monitor and/or determine the one or more transmission paths, may determine the transmission paths in response to particular network characteristic or detecting a changed network characteristic, or may determine the transmission paths in response to receiving an update for the local applications 302.

In some examples, the transmission path detector 128 may determine the one or more transmission paths, pathnames, and/or types of data being transmitted by the one or more transmission paths based on monitoring or detecting operations of the UE 102 at one or more communication protocol levels. For instance, the transmission path detector 128 may receive data from a radio protocol stack which may comprise a part of baseband or modem of the UE 102. The transmission path detector 128 may receive information from an upper-level Packet Data Convergence Protocol (PDCP) layer, one or more lower Radio Link control (RLC) layers, one or more yet lower Medium Access Control (MAC) layers, and/or one or more Physical (PHY) layers. The PDCP layer may receive data packets that have been provided for transmission through the protocol layers. The first application 114 and/or the second application 116 stored and/or executed on the UE 102 may, during operation, generate and provide application data to the device operating system for eventual wireless transmission. The application data may include any types of data and network communications to be transmitted wirelessly. The device operating system may comprise the TCP/IP layer that packetizes the application data into one or more IP data packets. The transmission path detector 128 may receive information from any of these protocol layers to identify the transmission paths, pathnames, and/or types of data being transmitted by the transmission paths.

The transmission path detector 128 may apply one or more processes to combinations of application data for identifying transmission paths, pathnames, and/or types of data being transmitted of the local applications 302 (e.g., the first local application 114 and/or the second local application 116). For example, transmission path detector 128 may use a pattern matching algorithm to identify at least one matching pattern in the application data or combinations of application data. Detecting or classifying a type of data associated with a particular transmission path may be based on identifying a matching pattern and/or a nearest approximation of a matching pattern.

In some examples, the transmission path detector 128 may determine the transmission paths, pathnames, and/or types of data based on a log of historical data of traffic from the local applications 302. Such historical data may be generated by a traffic logger and may comprise information regarding the traffic data. For example, the historical data may comprise type or category of the traffic data, source and destination internet protocol (IP) addresses and port protocols, source and destination domain names (e.g., such as server name indications (SNIs)), timestamps of the traffic, and size of the traffic, among other things. In some implementations, historical data of traffic on the network may be based on event data records (EDR), which may comprise duration of the traffic, data volume of the traffic, and web site/content accessed with the traffic.

In some examples, the transmission path detector 128 may send information indicating the local applications 302 stored and/or operating on the UE 102 (e.g., the first local application 114 and/or the second local application 116), information indicating the pathnames of the transmission paths for the local applications 302, information indicating the types of data transmitted by the transmission paths, information indicating a frequency or time of occurrence that the transmission paths transmit data.

FIG. 4 depicts an example system 400 that may be similar to, identical to, or form a portion of any of the systems discussed herein. FIG. 4 illustrates details of the transmission prioritizer 130, in some instances, determining connectivity rules 122 based at least in part on the network characteristics and the transmission paths.

In some examples, the transmission prioritizer 130 may receive indications of the one or more network characteristics (e.g., from the network connectivity detector 126) and indications of the one or more types of data being transmitted by the transmission paths of the local applications 302 (e.g., from the transmission path detector 128). The transmission prioritizer 130 may receive other network characteristic information, for instance, from another UE 102 or computing device, historical logs, or from the local applications 302. The transmission prioritizer 130 may receive other local application data (e.g., from the local applications 302, from the one or more databases 120, and/or from the remote server 304) indicating characteristics of the local applications 302.

In some examples, the transmission prioritizer 130 may analyze received information and apply one or more connectivity rules 122 to the information to determine which transmission paths to change (e.g., to pause, stop, and/or reduce downloading and/or uploading) in response to the detected network characteristics. The connectivity rules 122 may indicate that, should particular network characteristics and/or types of data for transmission be detected, the local application controller 132 is to pause or prohibit a particular transmission path from transmitting. For instance, the connectivity rules 122 may indicate that, should a particular network characteristic fall below a particular predetermined threshold value, then a particular type of data is to be prohibited from transmission. By way of example, the connectivity rules 122 may indicate that transmission paths for a video type of data are to be stopped, paused, or deprioritzed relative to other types of data in response to bandwidth falling below the predetermined bandwidth threshold value and/or in response to the UE 102 joining the second network 106 (which may comprise a "low" bandwidth network). The connectivity rules 122 may indicate that transmission paths for a large image type of data are to be stopped, paused, or deprioritized in response to determining a "low" bandwidth network condition. The connectivity rules 122 may indicate that a video screenshot data type of is to be prioritized and downloaded before the video data type or in lieu of the video data type.

In some examples, the connectivity rules 122 may instruct the connectivity manager application 112 to cause the local applications 302 to change the one or more transmission characteristics, which may comprise causing the local applications 302 to increase a download rate of a second transmission path corresponding to a photo type of data. In some instances, the one or more network characteristics may comprise at least one of a low bandwidth network, a high traffic network, or a high latency network; and the connectivity manager application 112 may cause the local applications 302 to change the one or more transmission characteristics of a transmission path, which may comprise inhibiting or causing a data backup transmission.

In some examples, the connectivity rules 122 may define one or more actions to be taken on based on application categories corresponding to the local applications 302. For instance, the connectivity rules 122 may indicate that, should the network characteristics comprise one or more of low bandwidth, high latency, high cost, and/or tolled-by-time type fee, one or more local applications 302 of a first particular application category (e.g., including some or all of the transmission paths of the local applications 302) are to be paused, stopped, and/or prohibited, such as a social network application, a gaming application, a shopping application, a chat application, an industrial control application, and/or a video streaming application. For instance, gaming applications may be paused based at least in part on a high latency network characteristic. The connectivity rules 122 may indicate that, should the network characteristics comprise one or more of unreliability, or unsecured, that one or more local applications 302 of a second particular application category e.g., including some or all of the transmission paths of the local applications 302 are to be paused, stopped, and/or prohibited, such as a finance application, a health application, an industrial control application, a shopping application, and/or one or more applications generating, accessing, or storing private or sensitive data. In some instances, the connectivity rules 122 may indicate that, based on a low bandwidth network characteristic, a video streaming application is to stop downloading data via an auto-play or preview video transmission path.

In some examples, the transmission prioritizer may access and apply connectivity rules 122 in an iterative process of repeatedly assessing network characteristics and operational transmission paths and may continually update classifications for data types being transmitted by the local applications 302 and/or application categories corresponding to the local applications 302.

In some examples, the transmission prioritizer 130 may receive information indicating the data types the local applications 302 transmit from various sources on the Internet. For example, a digital distribution service or database may comprise application information regarding descriptions of applications or application platforms provided by the digital distribution service. A description of an application may include name, type (gaming, non-gaming, browsing, non-browsing, social media, non-social media, finance, non-finance, health, non-health, and so on), popularity, rating (e.g., overall rating and/or content rating), genre, related application(s), and/or publication date(s).

In some examples, the transmission prioritizer 130 may determine an application classification of a particular application of the local applications 302 and may determine a subgroup of networks of a plurality of networks (e.g., the first network 104 and/or the second network 106) that corresponds to the application classification, wherein causing the local applications 302 to change one or more transmission characteristics or parameters may comprise changing a download rate for a particular transmission path of the particular application for the subgroup of networks. In some instances, the application classification may comprise a payment transactions application, and the subgroup of networks comprises high security network or a low security network. In some instances, the application classification comprises a first application classification, the subgroup of networks comprises a first subgroup of networks, and the transmission prioritizer 130 may determine that a second application classification comprises gaming applications and determine that a second subgroup of networks comprising a high latency network or a low latency network. In some instances, the transmission prioritizer may determine that a third application classification comprises video streaming applications and may determine that a third subgroup of networks comprising a high bandwidth network or a low bandwidth network.

In some examples, the transmission prioritizer 130 may apply one or more of various processes to combine different types of data from different sources to determine which connectivity rule 122 to apply. For example, the transmission prioritizer 130 may use a pattern matching algorithm to identify at least one matching pattern from the network characteristics and data types to a connectivity rule. Identifying connectivity rules 122 may be based on an identified matching pattern and/or a nearest approximation of a matching pattern. In some examples, upon matching network characteristics to connectivity rules 122, the transmission prioritizer 130 may send one or more indications to the local application controller 132 that the one or more transmission paths are to be modified (e.g., paused, stopped, prohibited, and/or reduced).

FIG. 5 depicts an example system 500 that may be similar to, identical to, or form a portion of any of the systems discussed herein. FIG. 5 illustrates details of the local application controller 132, for instance, changing transmission characteristics of one or more transmission paths of the first local application 114 and/or the second local application 116.

In some examples, the local application controller 132 may represent the communication interface between the transmission prioritizer 130 (e.g., that determines applicable connectivity rules 122) and the local applications 302 (e.g., the first local application 114 and/or the second local application 116). The local application controller 132 may send one or more API calls to the local applications 302 instructing the local applications 302 to stop, pause, prohibit, and/or reduce the transmission paths corresponding to pathnames determined by the transmission prioritizer 130, (e.g., "ads.example.com;" or "videos.example.com). For instance, the local application controller 132 may send a first API call to the first local application 114 prohibiting transmission on a first transmission path 502 (e.g., prohibiting a video type of data from transmitting); a second API call to the first local application 114 prohibiting transmission on a second transmission path 504 (e.g., prohibiting an advertisement type of data from transmitting); a third API call to the second local application prohibiting transmission on a third transmission path 506 (e.g., prohibiting a video type of data from transmitting); and/or sending a fourth API call to the second local application 116 prohibiting transmission on a fourth transmission path 508. In some instances, the local application controller 132 may send an instruction based on a one or more data classification buckets stored in the one or more databases 120 (e.g., which may be generated and/or stored by a developer of the local applications 302). The local application controller 132 may cause a change to cache settings for the local applications 302, such that data that was to be transmitted is instead cached at the UE 102. The local application controller 132 may comprise a tracking agent within a network stack to cause prohibit data transmissions at lower communication protocol levels than the application layer (e.g., the PDCP layer, the RLC layer, the MAC layer, and/or the PHY layer). The local application controller 132 may comprise a hardware component of the UE 102 (e.g., electrically erasable programmable read-only memory (EEPROM)), backend, and/or middleware. In some examples, the local application controller 132 may comprise an ethernet switch on the UE 102 or at a network node for changing a throughput on the transmission path. In some instances, the local application controller 132 may send an instruction to a radio access node (RAN) node, such as a gNodeB.

In some examples, one or more operations performed by the connectivity manager application 112 may be presented on the GUI 134. The GUI 134 may comprise a front-end of the connectivity manager application 112 or another application receiving information from the connectivity manager application 112 or a remote server (e.g., remote server 304 in FIG. 3). The GUI 134 may present a list of the local applications 302, indications of the application categories corresponding to the local applications 302, indications of the first network 104 and/or the second, indications of network types of the first network 104 and/or the second network 106, indications of the one or more network characteristics, indications of the connectivity rules 122, and/or indications of which applications are affected by which connectivity rules 122.

In some examples, the GUI 134 may comprise one or more interactive elements that, upon receiving an actuation or selection via a user input 510, cause the connectivity manager application to create or affect one or more connectivity rules 122, such as allowed lists and/or blocked lists. For instance, the user input 510 at an interactive element may create or modify an allowed network list indicating a preference for a particular network type or particular network characteristics (e.g., low cost, high bandwidth, low latency, flat fee, secure, and/or reliable), a blocked network list indicating a preference to avoid connecting to a network comprising a particular network characteristics (e.g., high cost, low bandwidth, high latency, tolled-by-time fee, unsecured, and/or unreliable), an allowed applications list indicating a preference to maintain transmission paths for one or more particular applications or application types, a blocked applications list indicating a preference to prohibit data transmission for one or more particular applications (e.g., in response to detecting a particular network characteristic), an allowed data type list indicating a preference to maintain transmission of a data type through multiple, different network conditions, and/or a blocked data type list indicating a preference to pause, stop, prohibit, or reduce transmission of one or more particular types of data (e.g., in response to detecting a particular network characteristic). In some instances, the GUI 134 may provide a prompt to receive the user input 510 in response to the local application being installed and/or receiving an update. In some instances, the GUI 134 may present a proposal of common connectivity rules 122 to new users (e.g., via a survey or poll), and/or may aggregate crowd sourced data to determine the connectivity rules 122. In some instances, the user input 510 may indicate one or more user characteristics associated with the user on which a connectivity rule 122 is based. For instance, the user characteristic may comprise a seeing impairment (e.g., color-blindness) which may correspond to a connectivity rule 122 that image data types are to be prohibited from presenting in gray-scale, or that image data types or text data types are to be prohibited. The user characteristic may comprise a hearing impairment which may correspond to a connectivity rule 122 that data packets comprising an audio data type are to be prohibited and/or replaced with a corresponding data packet comprising a text data type.

Figure 6:
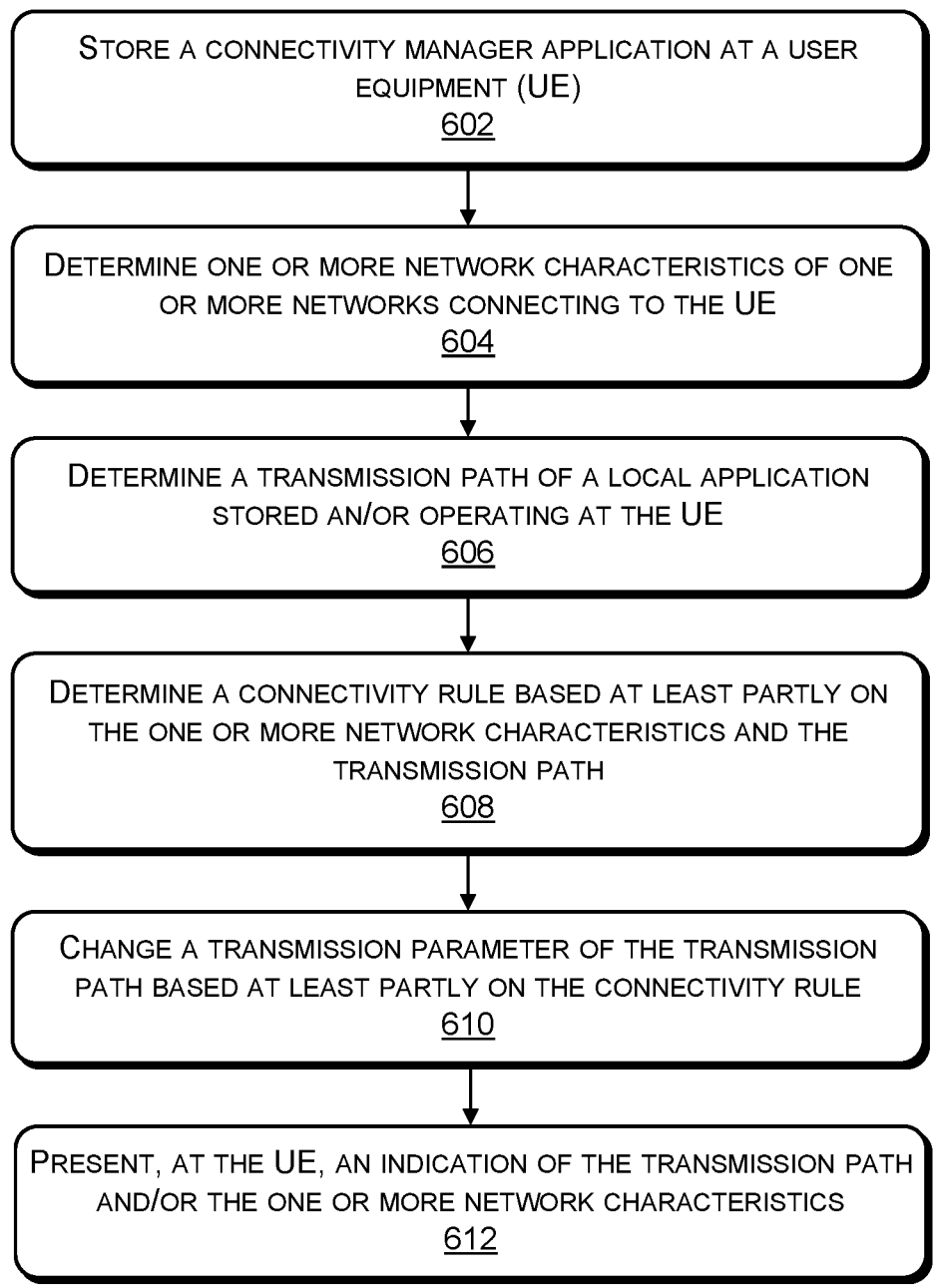
FIG. 6 depicts an example flow diagram illustrating a method for managing application connectivity in a multi-network environment, which may be performed by any system discussed herein.

FIG. 6 depicts an example method 600 that may be performed by any of the systems discussed herein. In some examples, the method 600 may include one or more steps for managing local application connectivity for the UE 102 in the multi-network environment. Although steps of the method 600 may be performed by any of the systems disclosed herein, the steps are described below as being performed by the system 100 for brevity sake.

At step 602, the system 100 may store the connectivity manager application 112 at the UE 102. For instance, the connectivity manager application 112 may comprise algorithmic components (e.g., software) for performing operations on the UE 102, such as a network connectivity detector 126, a transmission path detector 128, a transmission prioritizer 130, and/or a local application controller 132. The connectivity manager application 112 may be downloaded, for instance, from an application store on the UE 102. In some examples, the connectivity manager application 112 may comprise a pre-installed application on the UE 102 and/or may comprise an OS function of the UE 102 omitting a front-end component.

At step 604, the system 100 may determine one or more network characteristics of one or more networks connecting to the UE 102. For instance, the network connectivity detector 126 may determine the first one or more network characteristics of the first network 104 and/or the second one or more network characteristics of the second network 106. The connectivity manager application 112 may use connectivity-related data collected or determined by the network connectivity detector 126 to determine which connectivity rules 122 are relevant for the current multi-network environment and/or which transmission paths may be modified. For instance, the network connectivity detector 126 may determine a network type identifier (e.g., "5G" or "Wi-Fi"), IP address, and/or MAC address associated with the first network 104 and/or the second network 106 (e.g., via a SIP ACK message, ping, etc.) and may determine one or more predefined characteristics corresponding to the network type identifier IP address, and/or MAC address, such as bandwidth, throughput, and/or latency. For instance, the one or more database(s) 120 may store network persistent or generally constant network characteristic information associated with the network type identifier, IP address, and/or MAC address. The network connectivity detector 126 may determine changing, dynamic, or inconsistent network characteristics, for instance, by sending a ping on the first network 104 and/or the second network 106 to determine a corresponding ping delay. The network connectivity detector 126 may determine one or more changing network characteristics of the first network 104 or the second network 106, such as a congestion increase or decrease, a traffic increase or decrease, a throughput increase or decrease, a bandwidth increase or decrease, and/or a security update. In some instances, the network connectivity detector 126 may comprise a tracking agent executing on the UE 102 and/or on another computing device (e.g., a node of the first network 104 and/or the second network 106) in communication with the UE 102.

At step 606, the system 100 may determine a transmission path of a local application stored and/or operating at the UE 102. For instance, the transmission path detector 128 may determine the endpoint addresses and/or pathnames corresponding to transmission paths of the local applications 302 (e.g., the first local application 114 and/or the second local application 116). The pathnames may comprise alphanumeric strings including indicating the data type (e.g., "videos," "images," "thumbnail," "audio," "screenshot," "text," "comments," "ads"), and/or the application identifier (e.g., social media, email, audio streaming, etc. application names), and/or other information indicating the type of data transmitted by the transmission path. In some examples, the transmission path detector 128 may access information from a third-party ad tracker to determine the one or more transmission paths, corresponding pathnames, and/or types of data being transmitted by the one or more transmission paths. The transmission path detector 128 may determine the one or more transmission paths, for instance, by determining one or more strings from a header portion or a body portion of a message sent from the local applications 302 and comparing the one or more strings to a plurality of data type profile strings indicating the one or more transmission paths. The transmission path detector 128 may query the local applications 302 for a list of directory names and/or determine whether any directory names include an alphanumeric string indicating a type of data (e.g., "profile pictures," "videos," "comments," etc.). In some instances, the transmission path detector 128 may access one or more UE 102 device settings and/or application updates to determine one or more transmission paths, pathnames, and/or types of data being transmitted by the first local application 114 and/or the second local application 116. The transmission path detector 128 may determine that data is being transmitted via a Web Socket and may determine that the Web Socket corresponds to a video type of data. The transmission path detector 128 may determine that the data is being transmitted via an HTTP request, and/or a different type of request (e.g., a TCP message, an internet control message protocol (ICMP) message, a distributed network protocol (DNP) message, etc.) indicating a particular type of data (e.g., Hypertext Markup Language (HTML) text). In some instances, the transmission path detector 128 may continually monitor and/or determine the one or more transmission paths, may determine the transmission paths in response to particular network characteristic or detecting a changed network characteristic, or may determine the transmission paths in response to receiving an update for the local applications 302.

At step 608 the system 100 may determine a connectivity rule 122 based at least partly on the one or more network characteristics and the transmission path. For instance, the transmission prioritizer 130 may analyze information received from other operations performed by the connectivity manager application 112 (e.g., the connectivity detector 126 and/or the transmission path detector 128) and apply one or more connectivity rules 122 to the information to determine which transmission paths to change (e.g., to pause, stop, and/or reduce downloading and/or uploading) in response to the detected network characteristics. The connectivity rules 122 may indicate that, should particular network characteristics and/or types of data for transmission be detected, the local application controller 132 is to pause or prohibit a particular transmission path from transmitting. For instance, the connectivity rules 122 may indicate that, should a particular network characteristic fall below a particular predetermined threshold value, then a particular type of data is to be prohibited from transmission. By way of example, the connectivity rules 122 may indicate that transmission paths for a video type of data are to be stopped, paused, or deprioritzed relative to other types of data in response to bandwidth falling below the predetermined bandwidth threshold value and/or in response to the UE 102 joining the second network 116 (which may comprise a "low" bandwidth network). The connectivity rules 122 may indicate that transmission paths for a large image type of data are to be stopped, paused, or deprioritized in response to determining a "low" bandwidth network condition. The connectivity rules 122 may indicate that an image type of data is to be prioritized and downloaded before the video data type or in lieu of the video data type. In some instances, the UE 102 may determine location data (e.g., Global Positioning System (GPS) coordinates) associated with the UE 102, and transmission priorities or connectivity rules may be determined based at least in part on the location data.

At step 610, the system 100 may change a transmission parameter of the transmission path based at least partly on the connectivity rule 122. For instance, the local application controller 132 may send one or more API calls to the local applications 302 instructing the local applications 302 to stop, pause, prohibit, and/or reduce the transmission paths corresponding to pathnames determined by the transmission prioritizer 130, (e.g., "ads.example.com;" or "videos.example.com). In some instances, the local application controller 132 may send an instruction based on one or more data classification buckets stored in the one or more databases 120 (e.g., which may be generated and/or stored by a developer of the local applications 302). The local application controller 132 may cause a change to cache settings for the local applications 302, such that data that was to be transmitted is instead cached at the UE 102. For instance, in response to determining that the UE 102 has disconnected from the first network 104 and connected to the second network 106, and/or is connected to a network comprising a "low" bandwidth network," the local application controller 132 may prohibit video data type transmission paths from transmitting. In response to determining that the UE 102 has disconnected from the first network 104 and connected to the second network 106, and/or is connected to a network comprising a "high latency network," the local application controller 132 may prohibit local applications 302 comprising a gaming category from transmitting data. In response to determining that the UE 102 has disconnected from the first network 104 and connected to the second network 106, and/or is connected to a network comprising an "unsecured network," the local application controller 132 may prohibit local applications 302 comprising a sensitive-data type of application such as a finance category, a banking category, and/or a health category from transmitting data.

At step 612, the system 100 may present, at the UE 102, an indication of the transmission path and/or the network characteristics. For instance, the GUI 134 may present a list of the local applications 302, indications of the application categories corresponding to the local applications 302, indications of the first network 104 and/or the second, indications of network types of the first network 104 and/or the second network 106, indications of the one or more network characteristics, indications of the connectivity rules 122, and/or indications of which applications are affected by which connectivity rules 122. In some examples, the GUI 134 may comprise one or more interactive elements that, upon receiving an actuation or selection via a user input, cause the connectivity manager application to create or affect one or more connectivity rules 122, such as allowed lists and/or blocked lists. In some instances, the GUI 134 may provide a prompt to receive the user input in response to the local application being installed and/or receiving an update. In some instances, the GUI 134 may present a proposal of common connectivity rules 122 to new users (e.g., via a survey or poll), and/or may aggregate crowd sourced data to determine the connectivity rules 122. In some instances, the user input may indicate one or more user characteristics associated with the user on which a connectivity rule 122 is based. For instance, the user characteristic may comprise a seeing impairment (e.g., color-blindness) which may correspond to a connectivity rule 122 that image data types are to be prohibited from presenting in gray-scale, or that image data types or text data types are to be prohibited. The user characteristic may comprise a hearing impairment which may correspond to a connectivity rule 122 that data packets comprising an audio data type are to be prohibited and/or replaced with a corresponding data packet comprising a text data type. In some instances, the transmission priorities may comprise an instruction or prompt to the user to stop transmission of data from a sensitive-data type of application at least partly in response to the one or more network characteristics comprising unsecured network. In some instances, the transmission priorities comprise an instruction or user prompt to stop transmission of data from a gaming type of application at least partly in response to the one or more network characteristics comprising a high latency network.

Although FIG. 6 illustrate example operations, the described operations in FIG. 6 (and all other methods and operations disclosed herein) may be performed in other orders different than those illustrated in FIG. 6 and multiple steps may be performed simultaneously or in parallel. Furthermore, in some embodiments, one or more operations illustrated in FIG. 6 may be omitted, repeated, and/or combined with other operations illustrated in FIG. 6, or any other operations and components discussed in this disclosure. In some instances, any of the steps 602-612 may be performed at least partly in response to any other of the steps 602-612. In some instances, the operations illustrated in FIG. 6 may be performed in multiple iterations for instance, to manage connectivity for dozens, hundreds, or even thousands of applications operating on millions of devices.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A system comprising:
one or more processors; and
non-transitory computer-readable media storing instructions that, when executed by the one or more processors, cause the system to:
   determine one or more network characteristics of one or more networks accessible to the system;
   identify one or more applications operating on a User Equipment (UE);
   determine, by a first application of the UE and of the one or more applications communicating with additional applications of the one or more applications or network services, one or more transmission paths of the one or more applications for sending one or more types of data on the one or more networks, the one or more types of data comprise a one-to-one correspondence with the one or more transmission paths, wherein determining the one or more transmission paths comprises determining one or more strings of a message sent from the one or more applications and comparing the one or more strings to a list of data type profile strings indicating the one or more transmission paths;
   comparing the one or more strings to a plurality of data type profile strings indicating the one or more transmission paths;
   determine one or more transmission priorities based at least partly on the one or more network characteristics, an application type associated with the one or more types of data, and the one or more types of data and the one or more types of data;
   cause, based at least partly on the transmission priorities, the one or more applications to change one or more transmission characteristics of the transmission paths;
   detecting an update event for one of the one or more applications;
   sending an indication of the update event; and
   receiving, at least partly in response to the indication, an updated list of the data type profile strings.

2. The system of claim 1 wherein a type of data of the one or more types of data comprises one or more file sizes, and the one or more transmission priorities determines a download queue based on the one or more file sizes.

3. The system of claim 1, wherein determining the one or more network characteristics comprises determining whether a network comprises:
   a wired network or a wireless network;
   a high bandwidth network or a low bandwidth network;
   a high latency network or a low latency network;
   a high reliability network or a low reliability network;
   a high cost network or a low cost network;
   a flat fee network or a tolled fee network; and
   a secure network or an unsecure network.

4. The system of claim 1, wherein the one or more transmission priorities determines a download queue based at least in part on predefined priorities received from a network service.

5. The system of claim 1, wherein the one or more transmission priorities determines a download queue based at least in part on predefined priorities defined by a user.

6. The system of claim 1, wherein:
   the one or more network characteristics comprises at least one of a low bandwidth network, a high traffic network, or a high latency network; and
   causing the one or more applications to change the one or more transmission characteristics comprises inhibiting or causing a data backup transmission.

7. The system of claim 1, wherein causing the one or more applications to change the one or more transmission characteristics comprises:
   changing a first transmission characteristic of a first transmission path, which sends a particular type of data, for a first application of the one or more applications based on the particular data type or a predefined priority; and
   changing a second transmission characteristic of a second transmission path, which sends the particular type of data, for a second application of the one or more applications, based on the particular data type.

8. The system of claim 1, wherein when then instructions are executed by the one or more processors, the instructions cause the system to:
   access one or more priority threshold values associated with the one or more transmission paths; and
   wherein causing the one or more applications to change one or more transmission characteristics of the transmission paths is based at least partly on the one or more priority threshold values.

9. A method comprising:
   determining one or more network characteristics of one or more networks accessible to a User Equipment (UE);
   identifying a plurality of applications operating on the UE;
   determining, by a first application of the UE and of the plurality of applications communicating with additional applications of the plurality of applications or network services, one or more transmission paths of the additional applications for sending one or more types of data on the one or more networks, wherein determining the one or more transmission paths comprises determining one or more strings of a message sent from the additional applications and comparing the one or more strings to a list of data type profile strings indicating the one or more transmission paths; and
   comparing the one or more strings to a plurality of data type profile strings indicating the one or more transmission paths;
   determining, by the first application of the UE, one or more transmission priorities based at least partly on the one or more network characteristics and the one or more types of data; and
   changing, by the first application of the UE and based at least partly on the transmission priorities, one or more transmission characteristics of the transmission paths for the additional applications;
   detecting an update event for one of the additional applications;
   sending an indication of the update event; and
   receiving, at least partly in response to the indication, an updated list of the data type profile strings.

10. The method of claim 9, wherein determining the one or more transmission paths comprises determining one or more strings are from a header portion or a body portion of the message.

11. The method of claim 9, further comprising receiving, at the UE and from a server device, a second list of data type profile strings.

12. The method of claim 9, wherein:
   the one or more network characteristics comprises an unsecured network; and
   the transmission priorities comprise an instruction or user prompt to stop transmission of data from a sensitive-data type of application at least partly in response to the one or more network characteristics comprising unsecured network.

13. The method of claim 9, wherein the one or more network characteristics comprises a high latency network; and
   the transmission priorities comprise an instruction or user prompt to stop transmission of data from a gaming type of application at least partly in response to the one or more network characteristics comprising a high latency network.

14. A user device comprising:
   one or more processors; and
   non-transitory computer-readable media storing instructions that, when executed by the one or more processors, cause the device to:
      determine one or more network characteristics of a plurality of networks accessible to the user device;
      identify a plurality of applications operating on the user device;
      determine one or more transmission paths used by the plurality of applications for sending one or more types of data on the networks accessible to the user device, wherein determining the one or more transmission paths comprises determining one or more strings of a message sent from the plurality of applications and comparing the one or more strings to a list of data type profile strings indicating the one or more transmission paths;
      comparing the one or more strings to a plurality of data type profile strings indicating the one or more transmission paths;
      access one or more priority threshold values associated with the one or more transmission paths;
      determine transmission priorities based at least partly on the one or more network characteristics and the one or more types of data;
      cause, based at least partly on the transmission priorities and the one or more priority threshold values, a change to one or more transmission characteristics of the transmission paths;

detecting an update event for one of the plurality of applications;

sending an indication of the update event; and receiving, at least partly in response to the indication, an updated list of the data type profile strings.

15. The user device of claim 14, wherein the user device comprises a mobile computing device, the instructions, when executed, further cause the mobile computing device to determine location data associated with the mobile computing device and determine the transmission priorities is based at least partly on global position system (GPS) coordinates.

16. The user device of claim 14, wherein determining the transmission priorities further comprises:

determining an application classification of a particular application of the plurality of applications; and determining a subgroup of networks of the plurality of networks that corresponds to the application classification, wherein causing the plurality of applications to change the one or more transmission characteristics comprises changing a download rate or an upload rate for a particular transmission path of the particular application for the subgroup of networks.

17. The user device of claim 16 wherein:

the application classification comprises a payment transactions application; and the subgroup of networks comprises a high security network or a low security network.

18. The user device of claim 17, wherein:

the application classification comprises a first application classification;

the subgroup of networks comprises a first subgroup of networks; and the instructions, when executed by the one or more processors, further cause the user device to:

determine a second application classification comprising gaming applications; and determine a second subgroup of networks comprising a high latency network or a low latency network.

19. The user device of claim 18, wherein the instructions, when executed by the one or more processors, further cause the device to:

determine a third application classification comprising video streaming applications; and determine a third subgroup of networks comprising a high bandwidth network or a low bandwidth network.

20. The user device of claim 19, wherein determining the one or more network characteristics comprises determining that a first network of the plurality of networks comprises a fifth generation (5G) network and that a second network of the plurality of networks comprises a fourth generation (4G) network or a Long Term Evolution (LTE) network.

* * * * *